(12) United States Patent
Arima

(10) Patent No.: US 8,749,860 B2
(45) Date of Patent: Jun. 10, 2014

(54) DOCUMENT READING APPARATUS AND IMAGE PROCESSING METHOD

(75) Inventor: Makoto Arima, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 13/316,803

(22) Filed: Dec. 12, 2011

(65) Prior Publication Data

US 2012/0154874 A1    Jun. 21, 2012

(30) Foreign Application Priority Data

Dec. 17, 2010    (JP) .................................. 2010-281431

(51) Int. Cl.
*G03F 3/08* (2006.01)
*H04N 1/60* (2006.01)

(52) U.S. Cl.
USPC ............ 358/520; 358/1.1; 358/1.9; 358/3.26; 358/461; 358/505; 358/509; 358/518; 358/521

(58) Field of Classification Search
None
See application file for complete search history.

(56) References Cited

U.S. PATENT DOCUMENTS

| | | | |
|---|---|---|---|
| 7,692,818 B2 * | 4/2010 | Futami | 358/3.26 |
| 7,826,728 B2 * | 11/2010 | Konno et al. | 396/16 |
| 8,363,124 B2 * | 1/2013 | Mochida et al. | 348/229.1 |
| 2002/0031248 A1 * | 3/2002 | Maed et al. | 382/149 |
| 2002/0149799 A1 * | 10/2002 | Hayashi | 358/406 |
| 2008/0170273 A1 * | 7/2008 | Hashizume | 358/461 |
| 2010/0303346 A1 * | 12/2010 | Suito | 382/163 |

FOREIGN PATENT DOCUMENTS

| | | | |
|---|---|---|---|
| JP | 2002-044443 A | 2/2002 |
| JP | 2006-013852 A | 1/2006 |
| JP | 2007-081968 A | 3/2007 |

OTHER PUBLICATIONS

JPO Prosecution of JP2010-281431: Amendment to Claims dated Jan. 15, 2013 and Decision to Grant a Patent dated Feb. 5, 2013.*
Japanese Office Action issued on Nov. 13, 2012, in counterpart JPA 2010-281431.

* cited by examiner

*Primary Examiner* — Richard Zhu
(74) *Attorney, Agent, or Firm* — Fitzpatrick, Cella, Harper & Scinto

(57) ABSTRACT

A document reading apparatus, including: a conveyance portion which conveys a document; an illuminator which illuminates the conveying document; a reading portion which reads the conveying document at a read position; a reference member arranged opposite to the read position; a correction condition calculating portion which calculates a correction condition corresponding to each of a plurality of pixel positions based on image data obtained by the reading portion reading the reference member; and a correction portion which corrects image data of the document using the correction condition, wherein the correction condition calculating portion obtains a plurality of image data of the reference member corresponding to a first pixel position and its peripheral pixel position, and calculates a correction condition at the first pixel position based on remaining image data after excluding high brightness image data and low brightness image data.

6 Claims, 11 Drawing Sheets

○ A : LIGHT INTENSITY FLUCTUATION REFERENCE VALUE
◉ B : LIGHT INTENSITY FLUCTUATION VALUE

◉ C : LIGHT DISTRIBUTION FLUCTUATION CORRECTION COEFFICIENT

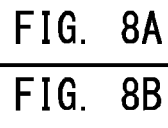
FIG. 8A
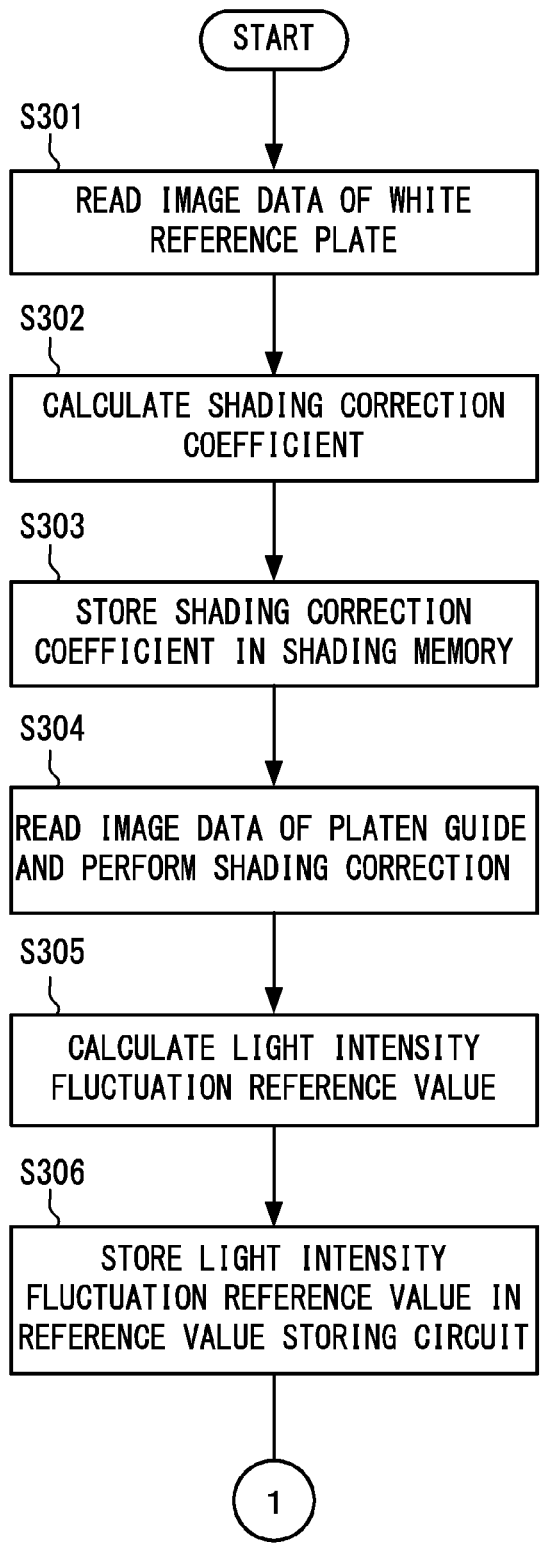

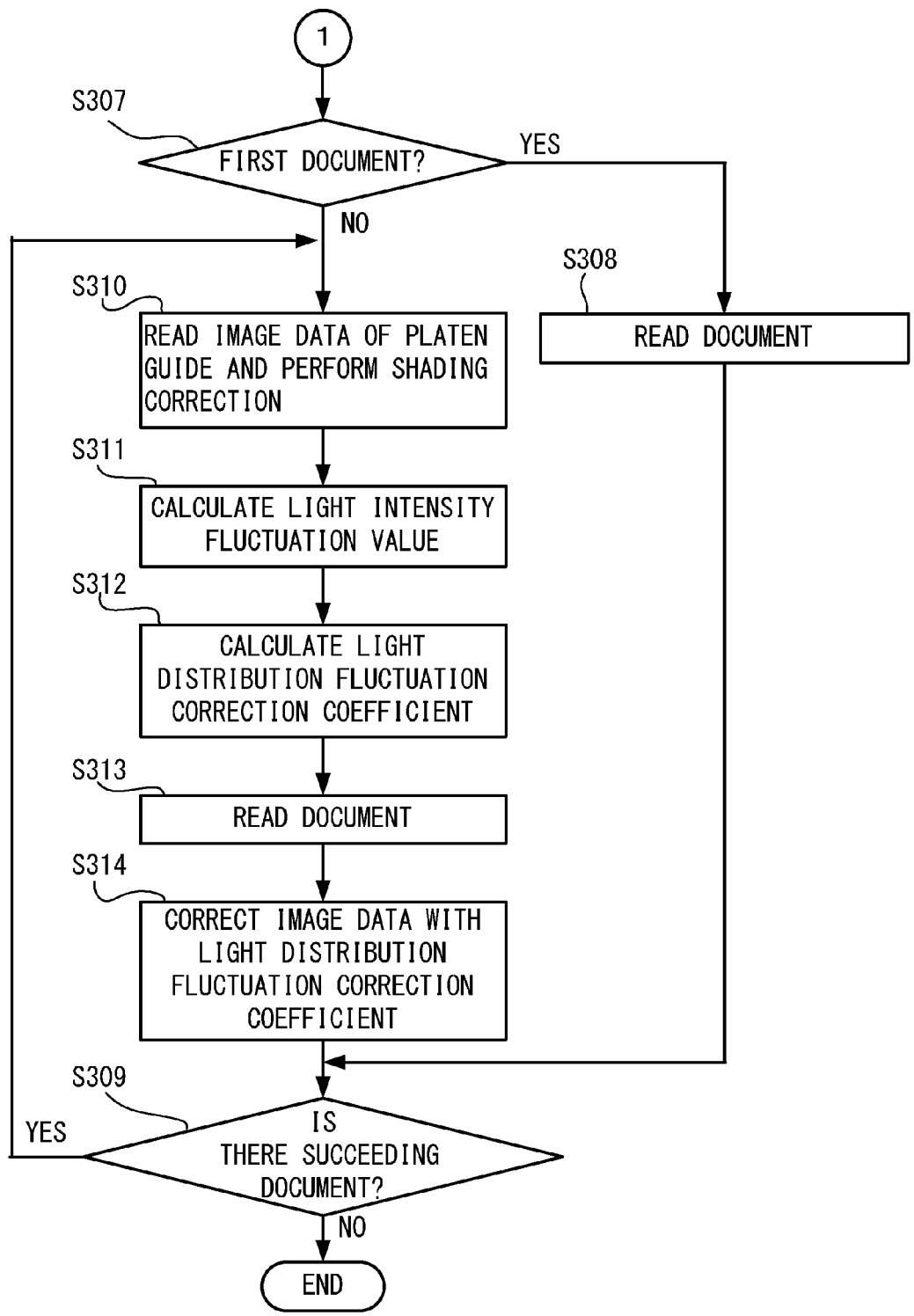

US 8,749,860 B2

DOCUMENT READING APPARATUS AND IMAGE PROCESSING METHOD

BACKGROUND OF THE INVENTION

1. Field of the Invention

The present invention relates to a document reading apparatus which reads an image of a document, and an image processing method.

2. Description of the Related Art

A document reading apparatus (hereinafter, referred to as "image reading apparatus") reads an image of a document, and converts information on the read image of the document into digital data. The image reading apparatus is capable of reading a monochrome image and a color image. The image reading apparatus is provided to an image forming apparatus such as a copying machine and a facsimile machine.

Conventionally, as the image reading apparatus to be used in a copying machine and the like, there has been known an image reading apparatus which performs so-called "flow-reading," in which an auto document feeder feeds documents one by one onto a document glass plate and an image of each document is read at a fixed position on the document glass plate while being fed.

This type of image reading apparatus is provided with an illumination device which illuminates a document. The illumination device comprises a rare gas fluorescent lamp typified by a white xenon lamp, or an LED array as a light source. In general, illumination light intensity of those types of light source tends to gradually decrease with time since the start of illumination.

In the conventional image reading apparatus capable of performing "flow-reading," when successive flow-reading is performed, a shading correction value is obtained before reading the first document, and thereafter the same correction value is used until the successive flow-reading is finished. Therefore, when the successive flow-reading is performed, an image quality is highly dependent on the illumination device, which greatly affects the document reading. In view of this, the technologies for avoiding and correcting deterioration of the light source have been improved.

In the image reading apparatus described in Japanese Patent Application Laid-Open No. 2007-081968, when the successive flow-reading is performed, there is obtained, for each inter-document spacing, an average value of image data corresponding to a predetermined number of pixels at each of several preset positions of a reference member (a conveyance belt) in a main scanning direction. By calculating a fluctuation amount of the average values of the respective positions, the light distribution fluctuation of the illuminator in the main scanning direction is corrected.

In the image reading apparatus described in Japanese Patent Application Laid-Open No. 2006-013852, there is calculated, for each inter-document spacing, an average value of image data corresponding to a predetermined number of pixels at each of several preset positions of a reference member (a guide member) in the main scanning direction. Among the average values of the respective positions, an average value exhibiting the smallest fluctuation amount is used for correcting the entire region in the main scanning direction. In this manner, when the correction value is obtained, erroneous correction due to a blot on the reference member is prevented.

In the case of the configuration of the image reading apparatus described in Japanese Patent Application Laid-Open No. 2007-081968, however, the reference member (conveyance belt) is normally arranged on a document path (a conveyance path), and hence the reference member is stained with paper dust, ink, toner, or the like of the document. For this reason, the reference member is stained with foreign substances, and as a result, a proper correction value (correction coefficient) cannot be obtained, which leads to a problem in that desired correction cannot be performed.

In the image reading apparatus described in Japanese Patent Application Laid-Open No. 2006-013852, an average value of image data corresponding to a predetermined number of pixels at each of several preset positions is calculated, and among the average values of the respective positions, an average value exhibiting the smallest fluctuation amount is used for correcting the entire main scanning region. Accordingly, it is possible to avoid the above-mentioned erroneous correction due to a blot on the reference member. However, even in a case where any one of the xenon lamp and the LED array is used as the light source, when a successive flow-reading operation is performed, the light intensity fluctuation amount differs among the main scanning positions because of, for example, a difference in degree of temperature rise among the main scanning positions. The correction described in Japanese Patent Application Laid-Open No. 2006-013852 is performed uniformly in the main scanning direction, and hence there is a problem in that proper correction cannot be performed when the fluctuation of the illuminator differs among the main scanning positions.

SUMMARY OF THE INVENTION

It is an object of the present invention to achieve highly-accurate document reading irrespective of a fluctuation in characteristics of an illuminator during flow-reading.

The present invention provides a document reading apparatus, including: a conveyance portion which conveys a document; an illuminator which illuminates the document that is being conveyed by the conveyance portion; a reading portion which reads, at a read position, the document that is being conveyed by the conveyance portion; a reference member arranged opposite to the read position; a correction condition calculating portion which calculates a correction condition corresponding to each of a plurality of pixel positions based on image data obtained by the reading portion reading the reference member; and a correction portion which corrects image data of the document using the correction condition corresponding to the each of the plurality of pixel positions of the image data, wherein the correction condition calculating portion is configured to: obtain a plurality of image data of the reference member corresponding to a first pixel position and a pixel position in a periphery of the first pixel position; and calculate a correction condition at the first pixel position based on remaining image data after excluding, from the plurality of image data, image data having a high brightness value and image data having a low brightness value, which are determined based on brightness of the plurality of image data.

Further features of the present invention will become apparent from the following description of exemplary embodiments with reference to the attached drawings.

BRIEF DESCRIPTION OF THE DRAWINGS

FIG. 8 is comprised of FIGS. 8A and 8B showing flowcharts illustrating an operation of the circuit configuration illustrated in FIG. 2.

DESCRIPTION OF THE EMBODIMENTS

Preferred embodiments of the present invention will now be described in detail in accordance with the accompanying drawings.

(First Embodiment)

Figure 1:
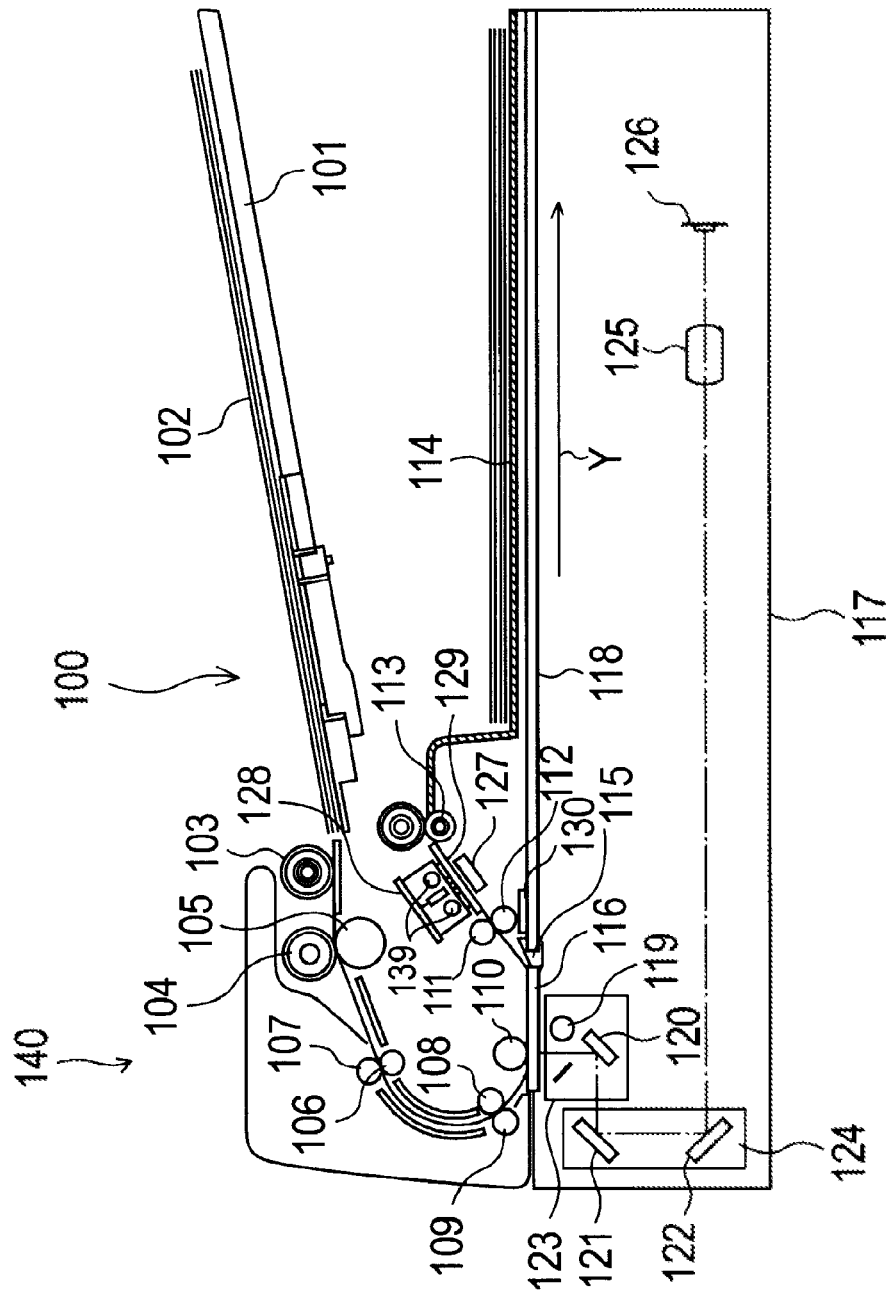
FIG. 1 is a view illustrating a configuration of an image reading apparatus according to a first embodiment.

FIG. 1 is a view illustrating a configuration of an image reading apparatus 100 according to a first embodiment. The image reading apparatus 100 includes an auto document feeder 140 and a reading apparatus main body 117. The auto document feeder 140 includes a document tray 101 on which documents 102 are stacked. On the upper side of the document tray 101, a sheet feeding roller 103 is provided. The sheet feeding roller 103 is connected to the same drive source as a separation conveyance roller 104. The sheet feeding roller 103 is rotated by the drive source to feed each document 102.

The sheet feeding roller 103 normally retreats to an upper position so that the sheet feeding roller 103 does not hinder work of setting the documents 102 onto the document tray 101. When a sheet feeding operation is started, the sheet feeding roller 103 descends to abut against an upper surface of the documents 102. The sheet feeding roller 103 is axially supported by an arm (not shown), and hence moves in a vertical direction by swinging the arm (not shown).

A separation conveyance driven roller 105 is arranged opposite to the separation conveyance roller 104, and is pressed toward the separation conveyance roller 104. The separation conveyance driven roller 105 is made of, for example, a rubber material causing slightly less friction than that of the separation conveyance roller 104. In cooperation with the separation conveyance roller 104, the separation conveyance driven roller 105 feeds one-by-one documents 102 that are fed by the sheet feeding roller 103.

Paired registration rollers constituted by a registration roller 106 and a registration driven roller 107 align a leading edge of the document 102 fed by the separation conveyance roller 104. The leading edge of the document 102 is aligned with the leading edge of the document 102 abutting a nip portion between the stopped paired registration rollers 106 and 107 to cause a loop in the document 102. In this manner, skew feed of the document 102 is modified.

Further, a lead roller 108 and a lead driven roller 109 convey the document onto a flow-reading glass 116. In flow-reading, a read position of a CCD line sensor 126 in a sub-scanning direction is set on the flow-reading glass 116. A platen guide 110 is arranged at a position opposed to the read position and above the flow-reading glass 116 so as to be illuminated by a light source 119. The platen guide 110 is used as a reference member for correcting a fluctuation in information to be obtained by reading an image on a front side of the document, the fluctuation in information being caused by a temporal fluctuation in light intensity distribution (light distribution) of the light source 119 in a main scanning direction.

The light source 119 illuminates the document 102 passing above the flow-reading glass 116. The light source 119 is an illumination member such as a rare gas fluorescent lamp or an LED array. The CCD line sensor 126 reads, in the main scanning direction, the image on the front side of the document 102 that is situated on the flow-reading glass 116. The main scanning direction is a longitudinal direction of the CCD line sensor 126, that is, a direction perpendicular to a conveyance direction (sub-scanning direction) of the document 102. When the CCD line sensor 126 finishes reading the image on the front side of the document 102, the document 102 is scooped by a jump stand 115 from the flow-reading glass 116.

The document 102 is conveyed by a read discharge roller 111 and a read discharge driven roller 112 toward a flow-reading glass 129. A platen guide 127 is arranged opposite to the flow-reading glass 129 so as to be illuminated by a light source 139. The platen guide 127 is used as a reference member for correcting a fluctuation in information to be obtained by reading an image on a back side of the document, the fluctuation in information being caused by a temporal fluctuation in light intensity distribution (light distribution) of the light source 139 in the main scanning direction.

The light source 139 illuminates the back side of the document 102 passing above the flow-reading glass 129. The light source 139 is an illumination member such as a rare gas fluorescent lamp or an LED array. A CIS line sensor 128 reads, in the main scanning direction, the image on the back side of the document 102 that is situated on the flow-reading glass 129. The main scanning direction is a longitudinal direction of the CIS line sensor 128, that is, a direction perpendicular to the conveyance direction (sub-scanning direction) of the document 102. When the CIS line sensor 128 finishes reading the image on the back side of the document 102, the document 102 is discharged to a sheet discharge tray 114 by a sheet discharge roller 113.

The reading apparatus main body 117 of the image reading apparatus 100 includes the light source 119 and mirrors (reflection members) 120, 121, and 122. The light source 119 applies light to a reading surface of the document 102 situated at a document reading portion, or the platen guide 110. The mirrors 120, 121, and 122 guide the light reflected from the document 102 or the platen guide 110 to a lens 125 and the CCD line sensor 126. The light source 119 and the mirror 120 are mounted onto a first mirror stand 123. Further, the mirrors 121 and 122 are mounted onto a second mirror stand 124.

The first mirror stand 123 and the second mirror stand 124 are coupled to a driving motor (not shown) via wires (not shown) so as to move in a direction parallel to a document glass plate 118 through rotational drive of the driving motor (not shown). Further, at an end portion of the document glass plate 118, there is mounted a white reference plate 130 for obtaining a reference value of read brightness. The white reference plate 130 is used as a reference for shading correction described later. The white reference plate 130 is arranged so that foreign substances do not adhere thereto. The reflection light from the document is guided to the lens 125 through the mirrors 120, 121, and 122, and is imaged by the lens 125 onto a light receiving portion of the CCD line sensor 126. The CCD line sensor 126 includes a light receiving element which performs photoelectric conversion on the imaged reflection light to output an electric signal corresponding to incident light intensity.

The CIS line sensor 128 similarly includes a light receiving element which performs photoelectric conversion on light reflected from the document 102 to output an electric signal corresponding to incident light intensity.

The reading apparatus main body 117 has a document fixed-reading mode, in which the document placed on the document glass plate 118 is read while moving the first mirror stand 123 and the second mirror stand 124 in the sub-scanning direction indicated by the arrow Y of FIG. 1. The reading apparatus main body 117 also has a document flow-reading mode, in which the front sides of the documents 102 fed above the flow-reading glass 116 by the auto document feeder 140 are successively read in a state in which the first mirror stand 123 is kept stopped at the read position at which the first mirror stand 123 is opposed to the flow-reading glass 116. In the document flow-reading mode, the CIS line sensor 128 may also be used for reading the image on the back side of the document 102.

Figure 2:
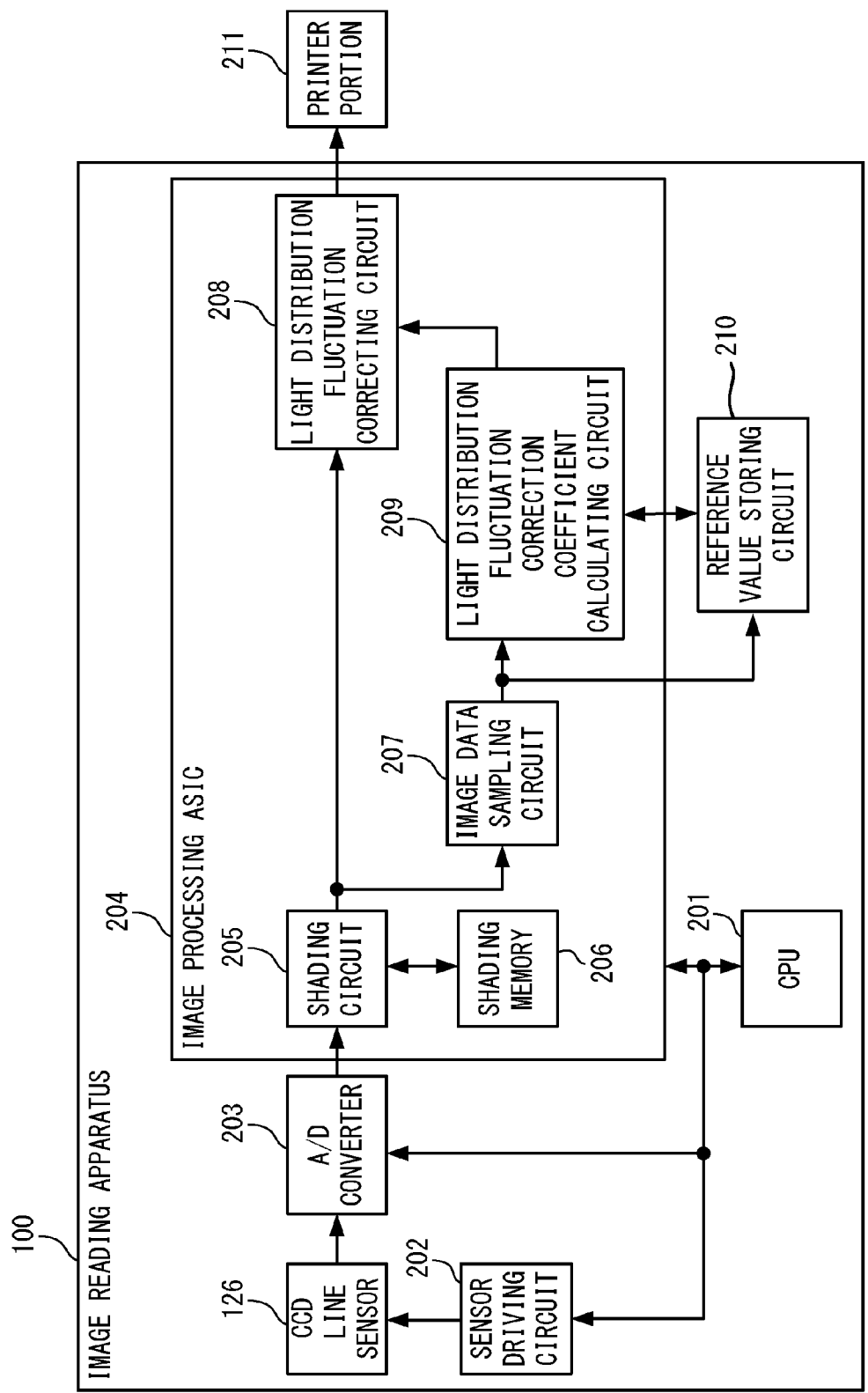
FIG. 2 is a block diagram illustrating a circuit configuration of the image reading apparatus of FIG. 1.

FIG. 2 is a block diagram illustrating a circuit configuration of the image reading apparatus 100 of FIG. 1. FIG. 2 illustrates circuits for processing image data obtained by reading the image of the document 102 by the CCD line sensor 126. Note that, a similar configuration may be employed for circuits for processing image data obtained by reading of the CIS line sensor 128.

A sensor driving circuit 202 controlled by a CPU 201 outputs a drive signal to the CCD line sensor 126. When the CCD line sensor 126 receives the drive signal from the sensor driving circuit 202, the CCD line sensor 126 reads the image of the document that is conveyed onto the flow-reading glass 116 in response to the drive signal, and outputs analog image data. An A/D converter 203 is controlled by the CPU 201 to convert the analog image data from the CCD line sensor 126 into digital image data.

The digital image data is input to an image processing ASIC 204 to be controlled by the CPU 201. In the image processing ASIC 204, a shading circuit 205 performs shading correction of modifying the effect of unevenness in sensitivity of the CCD line sensor 126, unevenness in illumination of the illumination unit, and the like. The shading correction is performed using a shading correction coefficient of the entire region in the main scanning direction, which is stored in a shading memory 206 provided inside the image processing ASIC 204. The shading circuit 205 also calculates the shading correction coefficient.

A calculation method of the shading correction coefficient will be described. The CCD line sensor 126 reads the white reference plate 130 before reading the document (including the first document). Based on image data of the white reference plate 130, the shading circuit 205 determines a shading correction coefficient SHD for each pixel (for example, 1 to 7,500 pixels of each of three colors) using the following math formula:

$$SHD(x) = WHtrg/IMGin(x)$$

where "WHtrg" represents a target value of the white reference plate 130, "IMGin" represents image data of the white reference plate 130, and "x" represents a main scanning position (1 to 7,500). The main scanning position refers to a pixel position in the main scanning direction. The calculated shading correction coefficient SHD(x) is stored in the shading memory 206.

The shading correction coefficient is calculated for each pixel SHD(x) based on each image data IMGin(x) obtained by reading the white reference plate 130. This calculation is realized because the white reference plate 130 is arranged so that foreign substances do not easily adhere thereto.

A light distribution fluctuation correcting circuit 208 performs light distribution fluctuation correction on image data of the second and subsequent documents based on a light distribution fluctuation correction coefficient. The light distribution fluctuation correction is not performed on the first document, and hence the input image data is output with no change.

The image data having undergone the light distribution fluctuation correction is subjected to some other image processing (for example, binary processing, density correction) (not shown), and is thereafter transmitted to a printer portion 211 which writes the image onto a sheet.

The light distribution fluctuation correction is to be performed in response to a temporal fluctuation in light intensity distribution (light distribution) of the light source in the main scanning direction. The light distribution fluctuation correction is to be performed for modifying the effect of the light intensity distribution of the light source in the main scanning direction after the fluctuation. In the light distribution fluctuation correction, gain for the image data is adjusted using a coefficient corresponding to the main scanning position (pixel position), which is calculated based on the light intensity distribution of the light source in the main scanning direction after the fluctuation and reference light intensity distribution in the main scanning direction.

An image data sampling circuit 207 calculates a light intensity fluctuation reference value and a light intensity fluctuation value to be used for the light distribution fluctuation correction, based on the image data obtained by reading the platen guide 110 serving as the reference member. The light intensity fluctuation value is data indicating the light intensity distribution (light distribution) of the illumination unit in the main scanning direction at the time of reading the platen guide 110.

The light intensity fluctuation reference value is calculated before reading the first document, and is stored in a reference value storing circuit 210. The light intensity fluctuation value is calculated before reading each of the second and subsequent documents (at the time between the reading of the preceding document and the reading of the succeeding document, that is, in the inter-document spacing).

A light distribution fluctuation correction coefficient calculating circuit 209 calculates the light distribution fluctuation correction coefficient of the correction target document based on the light intensity fluctuation reference value stored in the reference value storing circuit 210 and the light intensity fluctuation value obtained before reading the correction target document. The light distribution fluctuation correction coefficient is calculated also before reading each of the second and subsequent documents (at the time between the reading of the preceding document and the reading of the succeeding document, that is, in the inter-document spacing).

Figure 3:
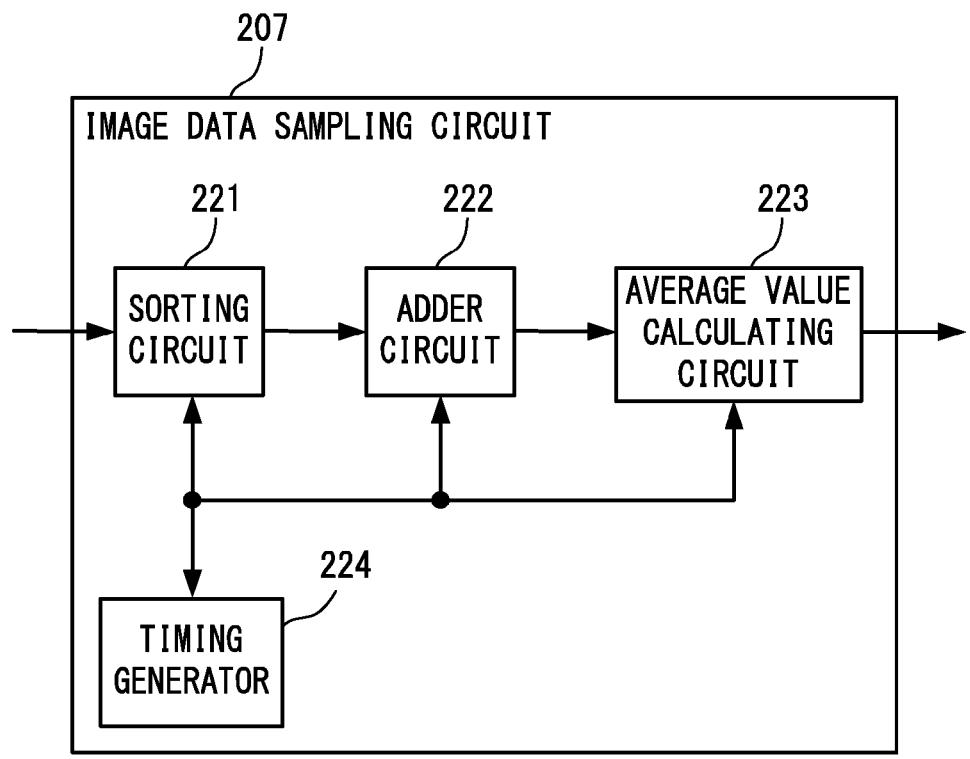
FIG. 3 is a block diagram illustrating a configuration of an image data sampling circuit in the circuit configuration illustrated in FIG. 2.

FIG. 3 is a block diagram illustrating a configuration of the image data sampling circuit 207.

The image data sampling circuit 207 divides the image data, which are obtained by the CCD line sensor 126 reading the platen guide 110 illuminated by the light source 119, into a plurality of regions in the main scanning direction. Then, the image data sampling circuit 207 detects a representative value of each of the plurality of regions based on the remaining image data excluding at least the image data having the highest brightness value and the image data having the lowest brightness value in each of the plurality of regions. More specifically, the image data sampling circuit 207 sorts the image data in each of the plurality of regions in an order of the brightness value. The image data sampling circuit 207 excludes the image data having a high brightness value and the image data having a low brightness value from the image data belonging to the same divided region among the image data sorted for each of the plurality of regions. Then, the image data sampling circuit 207 determines, for each of the divided regions, an average value of the image data that are not excluded.

Figure 4:
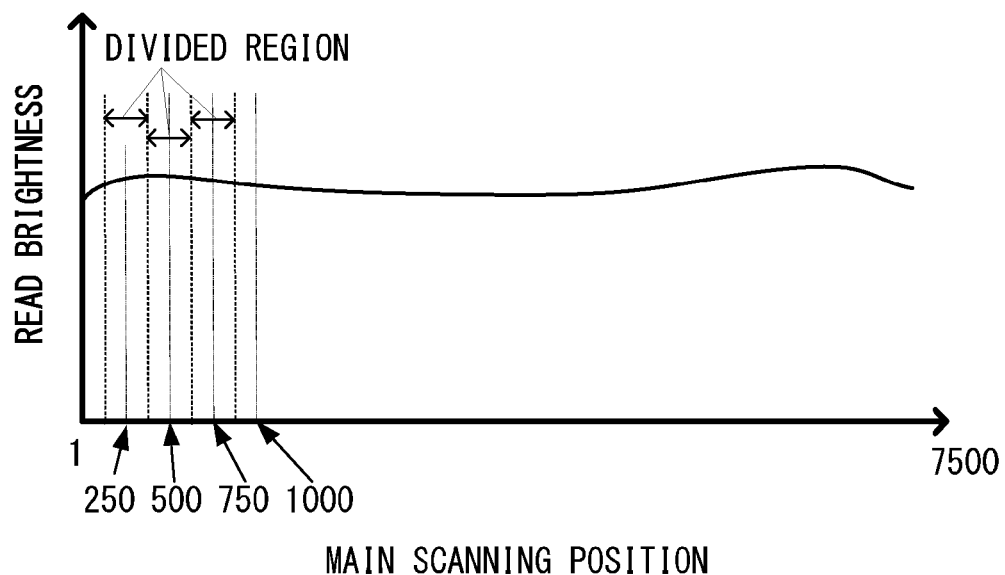
FIG. 4 is a graph illustrating an example of divided regions in a main scanning direction.

As illustrated in FIG. 4, based on a synchronization signal output from a timing generator 224, the obtained image data of the platen guide 110 is divided into a plurality of regions at regular intervals (for example, every 250 pixels) in the main scanning direction of the platen guide 110. In other words, in the obtained image data of the platen guide 110, an attention pixel and a predetermined number of pixels (for example, 250 pixels) peripheral to the attention pixel are regarded as one divided region.

The image data exhibits a brightness value on a pixel-by-pixel basis. The brightness value is herein represented by data corresponding to the light intensity fluctuation of the illuminator. For example, in a case where the CCD line sensor is a color sensor and therefore includes three RGB line sensors, the image data output from the CCD line sensor corresponds to RGB color component data. The brightness value herein corresponds not only to a brightness value determined by weighted addition of the RGB color components, but also to each RGB color component data.

A sorting circuit 221 sorts the image data in each of the plurality of divided regions in an ascending order of the brightness value on a pixel-by-pixel basis.

An adder circuit 222 selects the image data to be added, from among the image data sorted for each of the plurality of regions. The selected image data correspond to the image data belonging to the same divided region and excluding the image data having a high brightness value and the image data having a low brightness value.

Specifically, excluded are a first predetermined number (for example, 36 pixels) of the image data having a high brightness value, which are counted from the highest brightness value of the sorted the image data, and a second predetermined number (for example, 150 pixels) of the image data having a low brightness value, which are counted from the lowest brightness value of the sorted image data. The remaining image data (in this case, 64 pixels of the image data) correspond to the selected image data. The adder circuit 222 adds the selected image data for each of the plurality of regions.

An average value calculating circuit 223 calculates, for each of the plurality of regions, an average value based on a sum of the added image data and the number of added pixels. The average value calculated for each of the plurality of regions corresponds to the light intensity fluctuation value of the attention pixel in each of the regions.

The light intensity fluctuation value calculated based on the image data of the platen guide 110 that is read immediately before reading the first document corresponds to the light intensity fluctuation reference value, and this light intensity fluctuation reference value is stored in the reference value storing circuit 210. The light intensity fluctuation value calculated based on the image data of the platen guide 110 that is read in the inter-document spacing immediately before reading the second and subsequent processing target documents among the plurality of documents corresponds to the light intensity fluctuation value of the target document.

In this embodiment, the light intensity fluctuation value is the average value of 64 pixels of the image data remaining after excluding, from 250 pixels of the image data in each of the regions, 36 pixels of the image data having a high brightness value and 150 pixels of the image data having a low brightness value.

When "C(x)" represents a light intensity fluctuation value of the attention pixels at the main scanning position x, "Im(n)" represents data sorted in ascending order, and "n" represents a place of the ascending order ("1" represents the lowest brightness value), the following math formula is obtained:

$$C(X) = \sum_{n=151}^{214} Im(n)/64$$

Figure 5:
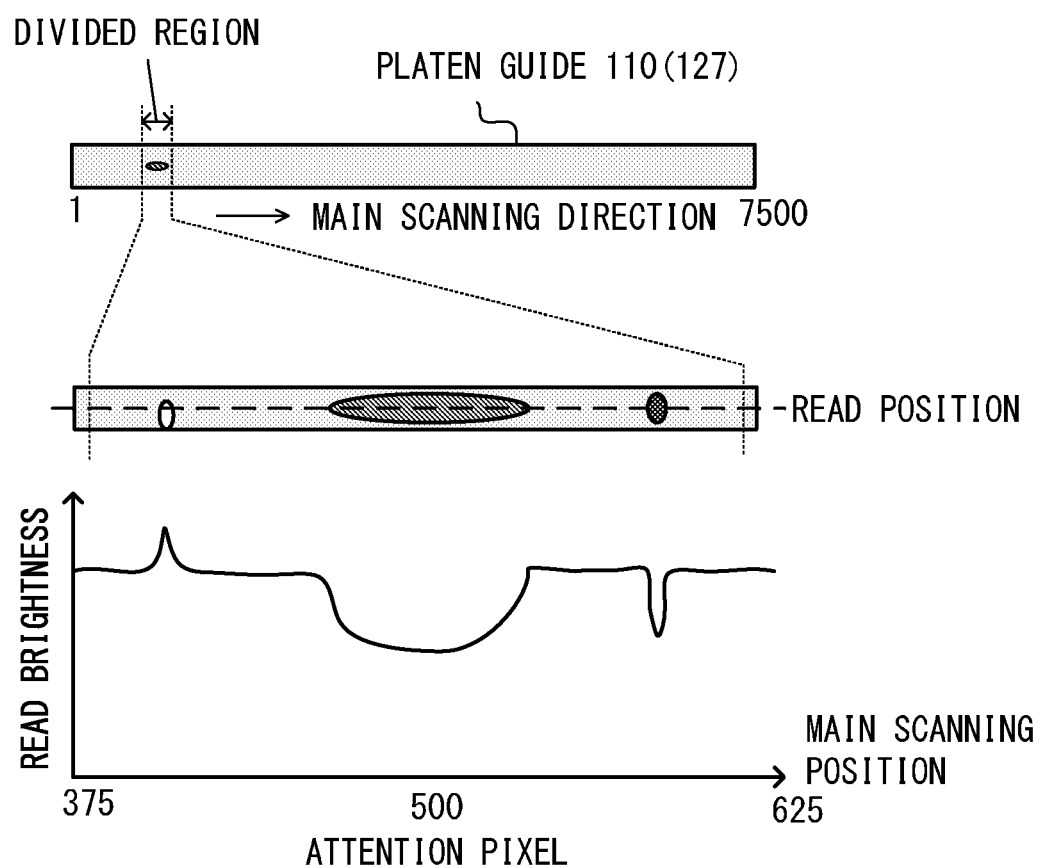
FIG. 5 is a diagram illustrating an example of image data in a case where a blot adheres to a certain divided region of a platen guide.
Figure 6:
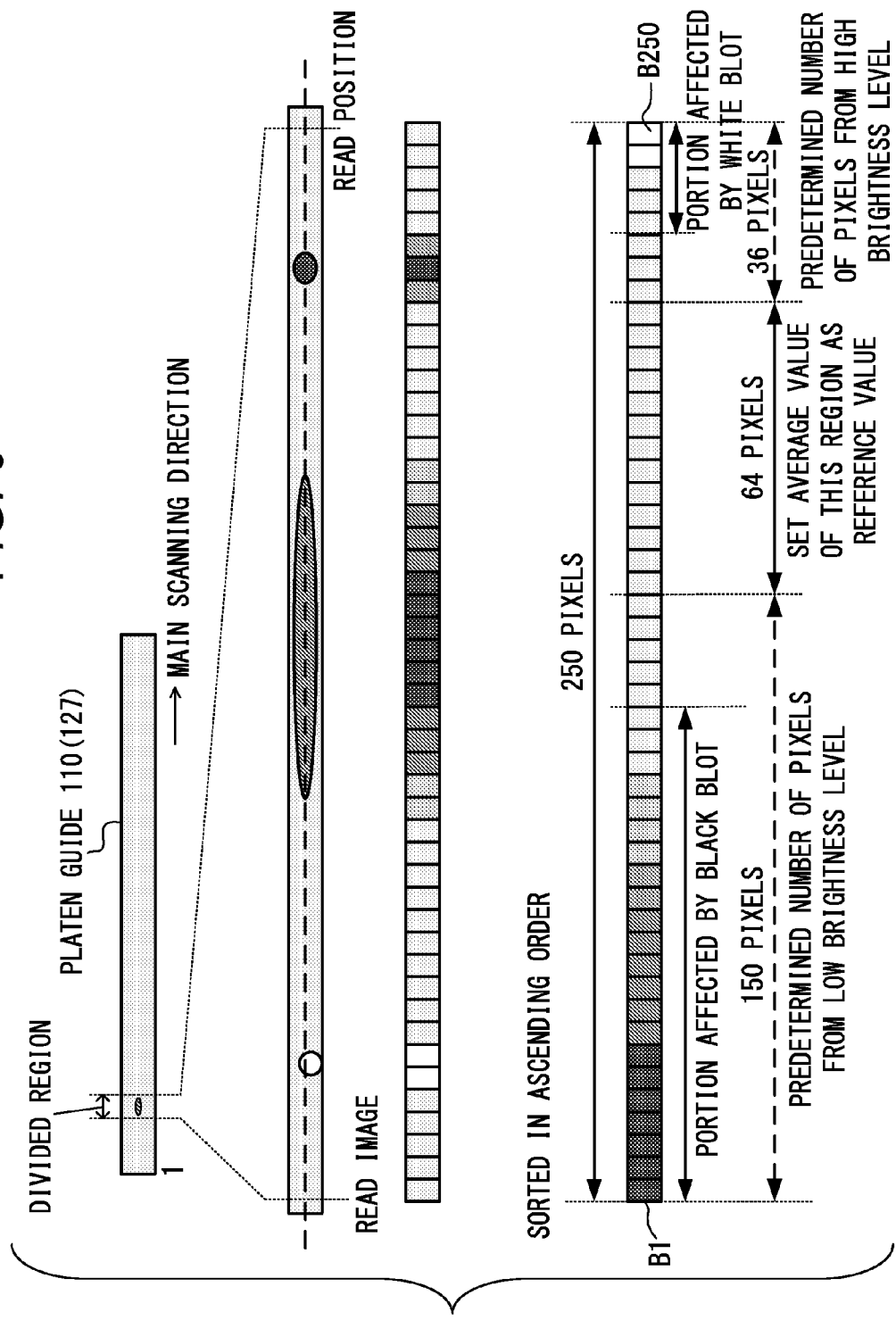
FIG. 6 is an explanatory diagram illustrating a calculation method of a light intensity fluctuation value in the example of FIG. 5.

FIG. 5 illustrates an example of the image data in a case where a blot adheres to a certain divided region of the platen guide 110. The platen guide 110 is arranged on the conveyance path of the document as illustrated in FIG. 1. Therefore, foreign substances may adhere to the platen guide 110. FIG. 6 is an explanatory diagram illustrating a calculation method of the light intensity fluctuation value in the example of FIG. 5. Referring to FIGS. 5 and 6, the reason why the reference value can be calculated properly even in the case where a blot adheres to the platen guide 110 will be described. Note that, in this embodiment, the platen guide 110 is read because of the flow-reading of the image on the front side of the document, but in a second embodiment described later, the platen guide 127 is read because of the flow-reading of the image on the back side of the document. Also in the second embodiment, the light distribution fluctuation correction is performed in a similar manner, and hence FIGS. 5 and 6 illustrate the platen guide as represented by reference symbol 110 (127), for the description common to both the embodiments.

FIG. 5 includes an enlarged view illustrating an enlarged divided region at an arbitrary position of the platen guide 110 (127) in the main scanning direction, and a graph of the read brightness plotted relative to the corresponding main scanning position (pixel position in the main scanning direction). The blot on the platen guide 110 (127) includes a black blot and a white blot. The black blot is generated when a foreign substance (such as toner and ink) having a lower brightness value than the brightness value of the platen guide 110 (127) itself adheres to the platen guide 110 (127). The white blot is generated when a foreign substance (such as paper dust) having a higher brightness value than the brightness value of the platen guide 110 (127) itself adheres to the platen guide 110 (127). The black blot and the white blot may adhere to the platen guide 110 (127) when the flow-reading is repeated. The platen guide 110 (127) used as a reference for the light distribution fluctuation correction is normally colored whitish. In this case, as a blot which may cause a trouble in calculating the light intensity fluctuation value, far more black blots are counted as compared to the white blots. Further, the black blot is generated due to toner or ink, and hence a wide range of the black blot may be generated. On the other hand, the white blot is mainly generated due to paper dust, and hence a wide range of the white blot is hardly generated.

FIG. 6 includes an enlarged view illustrating an enlarged divided region at a certain position of the platen guide 110 (127) (same as the enlarged view of FIG. 5), and diagrams illustrating the corresponding read image data and the image data sorted in an ascending order of the brightness value. The brightness value of the image data is represented by contrasting density.

The read image data are sorted by the sorting circuit 221. From the sorted image data, the first predetermined number (for example, 150) of the image data ranging from an end portion B1 on the low brightness value side toward the high brightness value side are excluded. From the sorted image data, the second predetermined number (for example, 36) of the image data ranging from an end portion B250 on the high brightness value side toward the low brightness value side are excluded. The average value of the remaining image data (for example, 64 pixels of the image data) is calculated. In this manner, it is possible to eliminate the effect of the white blot and the black blot adhering onto the platen guide 110 (127).

Figure 7A:
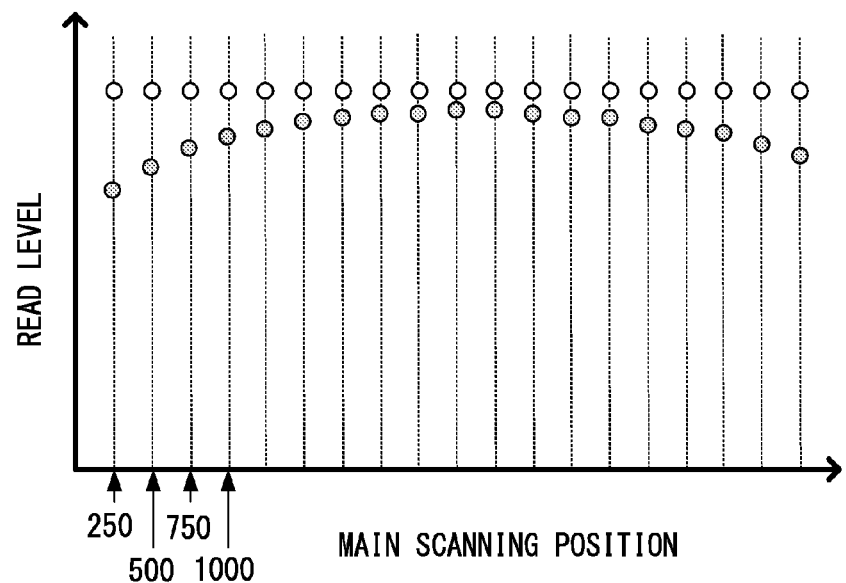
FIGS. 7A and 7B are explanatory graphs illustrating a light intensity fluctuation correction coefficient.
Figure 7B:
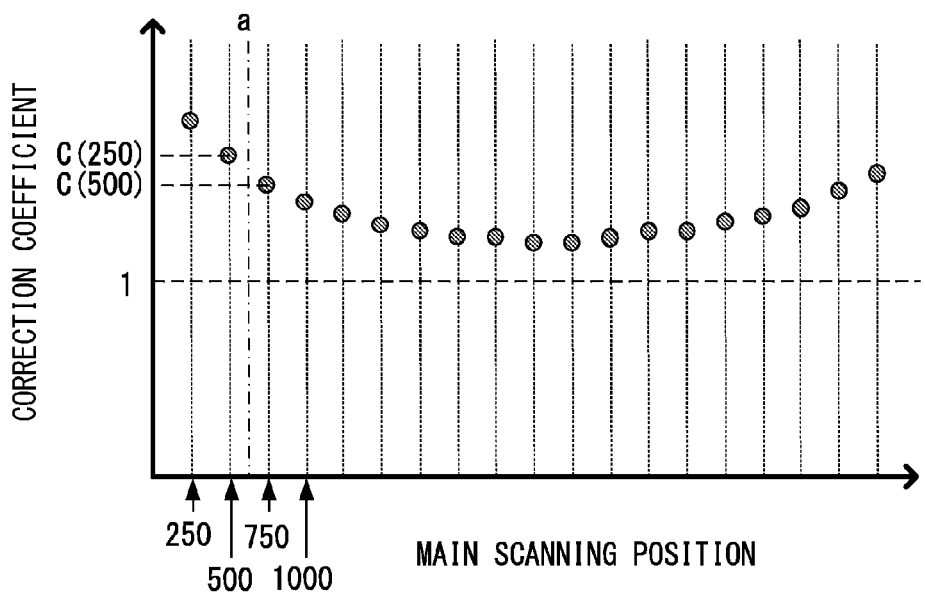

The light intensity fluctuation value is data indicating the light intensity distribution (light distribution) of the illumination unit in the main scanning direction. Thus, it is necessary to eliminate the effect of the blot adhering to the platen guide 110. Further, as illustrated in FIGS. 7A and 7B, the light intensity does not extremely change at neighboring positions. Therefore, in this embodiment, in order to determine the brightness value (read value) corresponding to the light intensity at a representative main scanning position, there are used the image data within a predetermined range (in this embodiment, 250 pixels) including the representative main scanning position. Then, the image data that may be affected by the blot are excluded, and an average value of the image data other than the above-mentioned image data is used. Further, the number of excluded pixel data having a low brightness value is set larger than the number of excluded pixel data having a high brightness value. This is because far more black blots are counted as compared to the white blots. In this manner, the effect of the blot and the effect of noise are reduced, with the result that the brightness value corresponding to the light intensity can be calculated with high accuracy.

Next, referring to FIGS. 7A and 7B, a calculation method of the light distribution fluctuation correction coefficient by the light distribution fluctuation correction coefficient calculating circuit 209 will be described in detail.

As described with reference to FIG. 4, FIG. 7A illustrates the read level of the guide (brightness value of the image data) calculated by the image data sampling circuit 207 for each of the plurality of divided main scanning regions, which are obtained by dividing, in advance, the region in the main scanning direction into a plurality of regions at regular intervals.

The point A of FIG. 7A indicates the light intensity fluctuation reference value in each of the plurality of regions, which is calculated by the image data sampling circuit 207 based on the image data obtained by reading the platen guide 110 immediately before reading the document. The main scanning position at the point A is a representative main scanning position of each of the plurality of regions. As illustrated in FIG. 4, in this embodiment, the representative main scanning position is set to the center position of each of the plurality of regions.

The shading correction is performed using the shading correction coefficient calculated immediately before reading the document, and hence the light intensity fluctuation reference values at the respective points A exhibit a flat characteristic in the main scanning direction.

The point B of FIG. 7A indicates the light intensity fluctuation value in each of the plurality of regions, which is calculated by the image data sampling circuit 207 based on the image data obtained by reading the platen guide 110 in a state in which the plurality of documents are read so that the light intensity is fluctuated.

FIG. 7A illustrates, as an example, a case where the light intensity drop of the light intensity fluctuation value is more significant at both end portions of the main scanning position than at the center of the main scanning position. In many cases, the light intensity after a lapse of time does not decrease uniformly in the main scanning direction as the illumination time increases, but is deteriorated non-uniformly in the main scanning direction depending on the configuration of the apparatus and the characteristics of the illumination unit.

The light distribution fluctuation correction coefficient calculating circuit 209 calculates the light distribution fluctuation correction coefficient based on a ratio of the light intensity fluctuation reference value obtained immediately before the start of reading to the light intensity fluctuation value obtained in the inter-document spacing after the start of reading. When "x" (discrete value) represents a main scanning position of a divided region, "A(x)" represents a light intensity fluctuation reference value at the main scanning position x, and "B(x)" represents a light intensity fluctuation value at the main scanning position x, a light intensity fluctuation correction coefficient C(x) at the main scanning position x is expressed in the following math formula:

(light intensity fluctuation correction coefficient $C(x)$)
=(light intensity fluctuation reference value $A(x)$)/(light intensity fluctuation value $B(x)$)

provided that the main scanning position x is represented by a discrete value of 250, 500, 750, . . . .

Subsequently, a correction coefficient at a pixel position other than the main scanning position x is calculated based on the calculated correction coefficient at the main scanning position x (discrete value). The correction coefficient at the main scanning position other than the main scanning position x (250, 500, 750, . . . ) is calculated through computation based on the correction coefficient at a proximate main scanning position x. For example, in FIG. 7B, a correction coefficient at a main scanning position "a" (position between the positions indicated by the pixel values of 500 and 750) is calculated through linear approximation of the correction coefficients at the main scanning positions indicated by the pixel values of 500 and 750. When "D(x)" represents a light distribution fluctuation correction coefficient at the main scanning position "a", and "C(x)" represents a light intensity fluctuation correction coefficient at the main scanning position indicated by the pixel value of 500, the following math formula is obtained:

$D(x)=C(500)+\{C(750)-C(500)\}/(750-500)\times(a-500)$

The light distribution fluctuation correction coefficients at the main scanning positions other than the main scanning position "a" are calculated using similar math formulae, and hence the light distribution fluctuation correction coefficient D(x) at the main scanning position x (between the positions indicated by n and n+α) is expressed in the following general formula:

$D(x)=C(n)+\{C(n+\alpha)-C(n)\}/\alpha\times(x-n)$ where "n" represents a main scanning position of the light intensity fluctuation correction coefficient, and "α" represents the number of pixels in each of the divided regions in the main scanning direction of the platen guide 110.

Based on the light distribution fluctuation correction coefficient D(x) at the main scanning position x, the light distribution fluctuation correcting circuit 208 corrects the image data of the document. When "Im_in(x)" represents image data obtained by reading the document, at the main scanning position x, and "Im_out(x)" represents image data obtained after correction, at the main scanning position x, the following correction formula is obtained:

$$Im\_out(x) = Im\_in(x) \times D(x)$$

In the image data of the second and subsequent documents, the light distribution fluctuation correction is performed on the image data of the target document by using the light distribution fluctuation correction coefficient calculated based on the image data of the platen guide 110 that is read in the inter-document spacing immediately before reading the target document.

Accordingly, it is possible to obtain proper image data even in the case where a fluctuation occurs in the illumination unit.

FIGS. 8A and 8B are flowcharts illustrating the above-mentioned operation of the image reading apparatus. This operation is performed by the CPU 201 controlling the auto document feeder 140 and the reading apparatus main body 117.

Before reading the first document after starting a job in the flow-reading mode, the CPU 201 causes the CCD line sensor 126 to read the image data of the white reference plate 130 (S301). Based on the read image data, the shading circuit 205 calculates the shading correction coefficient (S302). The calculated shading correction coefficient is stored in the shading memory 206 (S303).

Subsequently, the CPU 201 causes the CCD line sensor 126 to read the image data of the platen guide 110. The shading circuit 205 performs the shading correction on the read image data based on the shading correction coefficient stored in the shading memory 206 (S304).

The image data of the platen guide 110 having undergone the shading correction is transmitted to the image data sampling circuit 207, and the light intensity fluctuation reference value is calculated for each of the plurality of divided main scanning regions (S305). The calculation result is stored in the reference value storing circuit 210 (S306).

After the above-mentioned steps are completed, flow-reading of a plurality of documents is started. The CPU 201 determines whether or not the document to be read is the first document (S307). The shading correction is performed immediately before reading the first document, and the temporal fluctuation in light intensity does not progress. Hence, it is considered that there is no effect of the fluctuation of the illumination unit to the first document. When the document to be read is the first document ("YES" in S307), the first document is read without performing the light distribution fluctuation correction (S308). Note that, the determination step of Step S307 may be omitted so that the operation proceeds from Step S306 to Step S308 directly.

When the reading of the first document (S308) is finished, the CPU 201 determines whether or not there is a succeeding document (S309). When there is a succeeding document ("YES" in S309), the operation proceeds to Step S310. Note that, when there is a succeeding document ("YES" in S309), the operation may return to Step S307, and the CPU 201 may therefore determine whether or not the document to be read is the first document (S307). However, when there is a succeeding document ("YES" in S309), it is preferred that the operation proceed to Step S310 directly. This is because the determination step of Step S307 can be omitted.

For the second and subsequent documents, at a timing between the end of the reading of the preceding document and the start of the reading of the succeeding document (in the inter-document spacing), the shading correction is performed and the light distribution fluctuation correction coefficient for the light distribution fluctuation correction is determined. Specifically, when the document to be read is the second or subsequent document ("NO" in S307), the image of the platen guide 110 is read, and the shading circuit 205 performs the shading correction on the read image data based on the shading correction coefficient (S310).

Subsequently, the image data sampling circuit 207 calculates the light intensity fluctuation value for the same divided region as that for which the light intensity fluctuation reference value is calculated (S311).

Then, the light distribution fluctuation correction coefficient calculating circuit 209 calculates the light distribution fluctuation correction coefficient using the calculated light intensity fluctuation value and the light intensity fluctuation reference value, which is calculated before reading the first document and is stored in the reference value storing circuit 210 (S312).

Subsequently, the document is read (S313), and the light distribution fluctuation correcting circuit 208 performs the light distribution fluctuation correction on the read image data based on the light distribution fluctuation correction coefficient (S314).

When there is a succeeding document to be read ("YES" in S309), the CPU 201 repeats the steps of S310 to S314. When there is no succeeding document to be read ("NO" in S309), the flow-reading mode is finished.

In the first embodiment, the sorting circuit 221 of the image data sampling circuit 207 sorts the image data in each of the plurality of divided regions in an ascending order of the brightness value on a pixel-by-pixel basis. However, the present invention is not limited to the sorting of the image data in the ascending order of the brightness value. Similar effects may be produced even in a case of sorting of the image data in a descending order of the brightness value.

Further, in the first embodiment, the light intensity fluctuation value is obtained for each document, but may be obtained at another timing. For example, the light intensity fluctuation value may be obtained once for a predetermined number of documents. Further, in the first embodiment, the light intensity fluctuation value is calculated independently for each document, but the light intensity fluctuation value of the correction target may be calculated using light intensity fluctuation values obtained through a plurality of times of calculation. For example, the light intensity fluctuation values at the same representative position may be used for weighted addition.

Further, in the first embodiment, when the light intensity fluctuation value is calculated, the average value is used as a statistical value, but for example, there may be used another statistical value such as a mode or a weighted average using a weight based on a distance between the attention position and the position of the image data.

(Second Embodiment)

Next, a second embodiment will be described.

An image reading apparatus which reads both sides of the document by conveying the document once includes a document reading portion which reads the front side of the document, and a document reading portion which reads the back side of the document. In the case of reading the front side of the document, the image reading apparatus has, in many cases, a platen mode (document fixed-reading mode), in which the document placed on the document glass plate is read, and a flow-reading mode. Hence, the optical system is normally movable. Therefore, immediately before reading the document, the optical system is moved to the white reference plate (shading correction reference member) arranged at a different position from the position of the document reading portion so that the white reference plate can be read. On the other hand, in the case of reading the back side of the document, the back side of the document is read mostly in the flow-reading mode. Thus, in order to read the white reference plate in the case of reading the back side of the document, it is necessary to separately provide a reading portion moving mechanism (alternatively, flow-reading glass moving mechanism) only for reading the white reference plate. From the viewpoint of cost reduction, there is a demand for a configuration with no need to provide such a moving mechanism.

In the case of the configuration devoid of such a reading portion moving mechanism, the shading correction reference member cannot be read immediately before reading the document. Thus, the shading correction reference member may instead be read using a dedicated jig at the time of factory shipment or adjustment in the market, and the reading result may be stored in advance.

However, the shading correction reference data obtained at the time of factory shipment (alternatively, at the time of adjustment in the market) cannot serve to correct the deterioration component of the illumination unit. Therefore, there is obtained data of the platen guide serving as a reference for the light intensity fluctuation correction, together with the data of the shading correction reference member, at the time of factory shipment (alternatively, at the time of adjustment in the market). The platen guide is read before reading the document, and therefore the light distribution fluctuation correction is performed, to thereby correct the deterioration component of the illumination unit that progresses during the period between the time of factory shipment (alternatively, the time of adjustment in the market) and the time before reading the document.

The following description is directed, as an example, to the case of the factory shipment. The equivalent processing is performed at the time of adjustment in the market, and detailed description thereof is therefore omitted herein.

Figure 9:
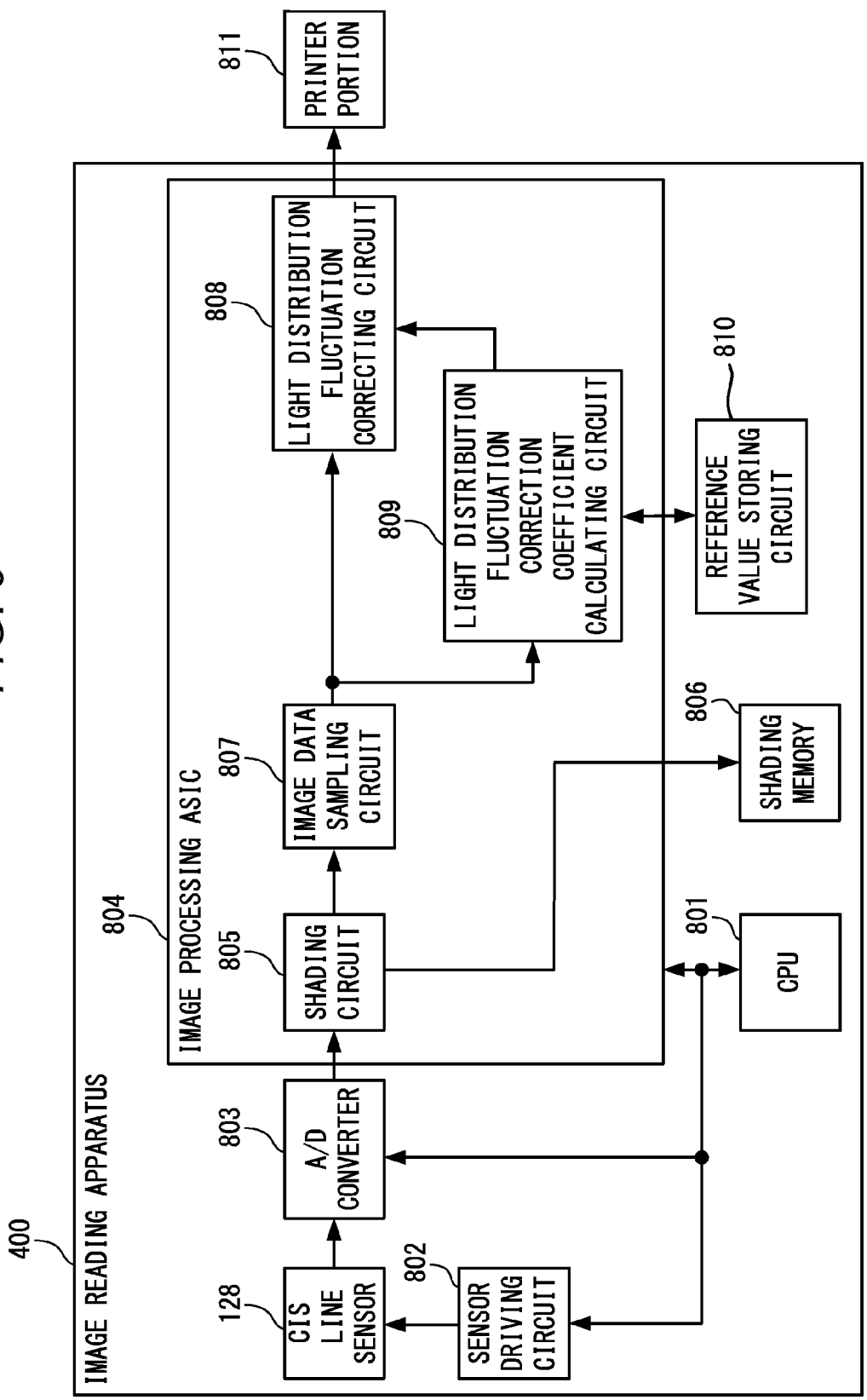
FIG. 9 is a block diagram illustrating a circuit configuration of an image reading apparatus according to a second embodiment.

FIG. 9 is a diagram illustrating image processing circuits of an image reading apparatus 400 according to the second embodiment. Components other than the image processing circuits of the image reading apparatus 400 according to the second embodiment are similar to those of the image reading apparatus 100 according to the first embodiment illustrated in FIG. 1, and description thereof is therefore omitted herein.

A sensor driving circuit 802 controlled by a CPU 801 outputs a drive signal to the CIS line sensor 128. When the CIS line sensor 128 receives the drive signal from the sensor driving circuit 802, the CIS line sensor 128 reads, in response to the drive signal, the image of the document that is conveyed onto the flow-reading glass 129, and outputs analog image data. An A/D converter 803 is controlled by the CPU 801 to sequentially convert the analog image data from the CIS line sensor 128 into digital image data.

The digital image data is input to an image processing ASIC 804 controlled by the CPU 801. In the image processing ASIC 804, a shading circuit 805 performs shading correction of correcting the effect of unevenness in sensitivity of the CIS line sensor 128. The shading correction is performed by using a shading correction coefficient of the entire region in the main scanning direction, which is stored in a nonvolatile shading memory 806 provided outside the image processing ASIC 804.

The image data having undergone the shading correction is input to a light distribution fluctuation correcting circuit 808 via an image data sampling circuit 807. The image data sampling circuit 807 calculates a light intensity fluctuation reference value and a light intensity fluctuation value to be used for the light distribution fluctuation correction, based on the image data obtained by reading the platen guide 127 serving as the reference member. The image data sampling circuit 807 has a similar function as the image data sampling circuit 207 of the first embodiment, and detailed description thereof is therefore omitted herein.

The light distribution fluctuation correcting circuit 808 performs the light distribution fluctuation correction on the image data based on a light distribution fluctuation correction coefficient. The light distribution fluctuation correction coefficient used by the light distribution fluctuation correcting circuit 808 is calculated by a light distribution fluctuation correction coefficient calculating circuit 809 based on the light intensity fluctuation reference value and the light intensity fluctuation value. The light intensity fluctuation reference value is stored in a reference value storing circuit 810 using a nonvolatile memory, which is provided outside the image processing ASIC 804. The light intensity fluctuation value is calculated by the image data sampling circuit 807. The image data having undergone the light distribution fluctuation correction performed by the light distribution fluctuation correcting circuit 808 is subjected to some other image processing (not shown), and is thereafter transmitted to a printer portion 811 for writing the image onto a sheet.

The processing of the image data sampling circuit 807 is similar to that of the image data sampling circuit 207 according to the first embodiment, and description thereof is therefore omitted herein. The processing of the light distribution fluctuation correction coefficient calculating circuit 809 is similar to that of the light distribution fluctuation correction coefficient calculating circuit 209 according to the first embodiment, and description thereof is therefore omitted herein. The processing of the light distribution fluctuation correcting circuit 808 is similar to that of the light distribution fluctuation correcting circuit 208 according to the first embodiment, and description thereof is therefore omitted herein. The processing of the reference value storing circuit 810 is similar to that of the reference value storing circuit 210 according to the first embodiment, and description thereof is therefore omitted herein.

Figure 10:
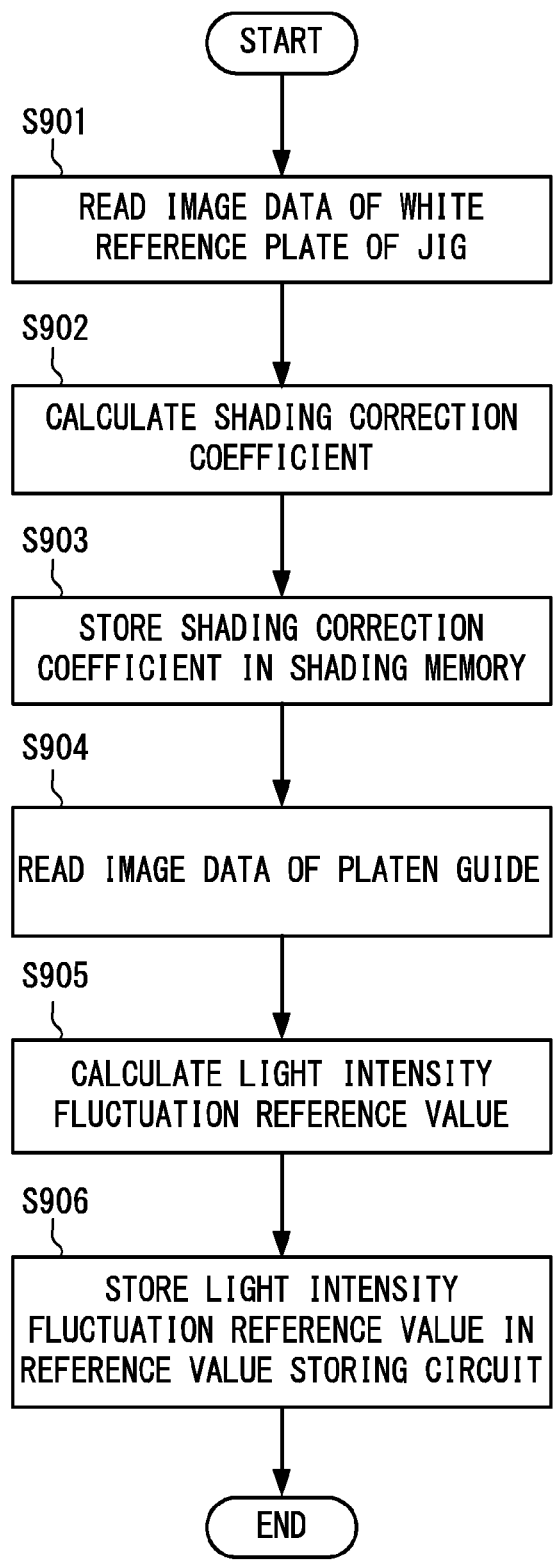
FIG. 10 is a flowchart illustrating a reference value obtaining operation according to the second embodiment.

FIG. 10 is a flowchart illustrating an operation of obtaining the light intensity fluctuation reference value according to the second embodiment.

The image reading apparatus 400 according to this embodiment reads the image on the back side of the document without the reading portion moving mechanism (alternatively, flow-reading glass moving mechanism), and hence cannot read the shading correction reference member immediately before the reading. Therefore, it is necessary to read the shading correction reference member using the dedicated jig and store, in advance, the shading correction coefficient obtained based on the image data. FIG. 10 is a flowchart illustrating an operational sequence therefor. This operation is performed by the CPU 801 controlling the auto document feeder 140 and the reading apparatus main body 117. The CPU 801 causes the CIS line sensor 128 to read image data of a white reference plate (not shown) of the jig (S901). The white reference plate of the jig is a white reference plate that may be arranged opposite to the flow-reading glass 129 in the manufacturing steps at the factory. Based on the read image data, the shading circuit 805 determines a shading correction coefficient SHD for each pixel (for example, 1 to 7,500 pixels of each of three colors) through computation using the following math formula (S902):

$$SHD(x) = WHtrg / IMGin(x)$$

where "WHtrg" represents a target brightness value of the white reference plate of the jig, "IMGin" represents a brightness value of the read image, and "x" represents a main scanning position (1 to 7,500). The calculated shading correction coefficient SHD(x) is stored in the shading memory 806 (S903).

Subsequently, an image of the platen guide 127 is read, and the shading correction is performed based on the shading correction coefficient, which is calculated by the shading circuit 805 and is stored in the shading memory 806 (S904).

The image data of the platen guide having undergone the shading correction is transmitted to the image data sampling circuit 807. The light intensity fluctuation reference value is calculated for each of the plurality of divided main scanning regions (S905). The calculation result is stored in the reference value storing circuit 810 (S906). The reference value storing circuit 810 is a nonvolatile memory.

Figure 11:
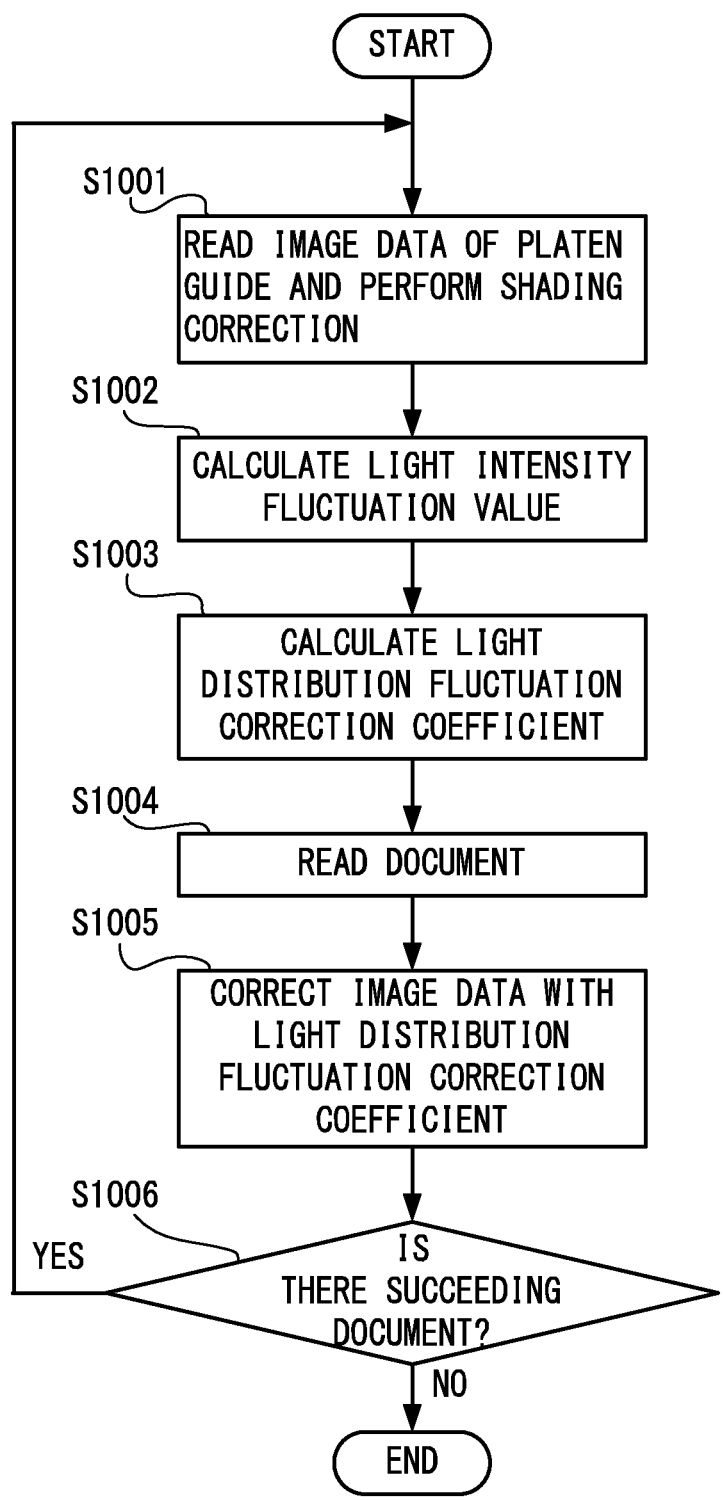
FIG. 11 is a flowchart illustrating a light distribution fluctuation correcting operation according to the second embodiment.

FIG. 11 is a flowchart illustrating an operation to be performed at the time of reading the document according to this embodiment. This operation is performed by the CPU 801 controlling the auto document feeder 140 and the reading apparatus main body 117.

Before reading the first document after starting a job in the flow-reading mode, the CPU 801 causes the CIS line sensor 128 to read the image data of the platen guide 127. The shading circuit 805 performs the shading correction on the read image data based on the shading correction coefficient stored in the shading memory 806 in advance at the time of factory shipment (S1001).

Subsequently, the image data sampling circuit 807 calculates the light intensity fluctuation value for the same region (each of the plurality of divided main scanning regions) as that for which a light distribution fluctuation reference value is calculated at the time of factory shipment (S1002).

Subsequently, the light distribution fluctuation correction coefficient calculating circuit 809 determines the light distribution fluctuation correction coefficient using the light intensity fluctuation reference value, which is calculated at the time of factory shipment and is stored in the reference value storing circuit 810, and the light intensity fluctuation value calculated by the image data sampling circuit 807 (S1003). The calculation method of the light distribution fluctuation correction coefficient is similar to that of the first embodiment, and detailed description thereof is therefore omitted herein.

Then, the image of the document is read (S1004), and the light distribution fluctuation correcting circuit 808 performs the light distribution fluctuation correction on the read image data of the document based on the light distribution fluctuation correction coefficient calculated by the light distribution fluctuation correction coefficient calculating circuit 809 (S1005).

The CPU 801 determines whether or not there is a succeeding document to be read (S1006). When there is a succeeding document ("YES" in S1006), the CPU 801 repeats the steps of S1001 to S1005. When there is no succeeding document to be read ("NO" in S1006), the flow-reading mode is finished.

As described above, the above-mentioned light distribution fluctuation correction is performed every time one sheet is read until the flow-reading is finished. Accordingly, it is possible to obtain proper image data even in the case where a deterioration occurs in the illumination unit from the time of factory shipment.

Note that, this embodiment is applied to, for example, a document reading portion which reads the back side of the document, which is provided in an image reading apparatus which reads both sides of the document in a single conveyance of the document.

Note that, in the first and second embodiments, coefficients are used in the shading correction and the light distribution fluctuation correction, but any condition in a different format, such as a correction table or a correction function, may be used instead.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281431, filed Dec. 17, 2010, which is hereby incorporated by reference herein in its entirety.

What is claimed is:

1. A document reading apparatus, comprising:
a conveyance portion which conveys a document;
an illuminator which illuminates the document that is being conveyed by the conveyance portion;
a reading portion which reads, at a read position, the document that is being conveyed by the conveyance portion;
a reference member arranged opposite to the read position;
a shading correction portion which performs a shading correction on image data output from the reading portion using a shading correction condition corresponding to a pixel position in a main scanning direction of the image data;
a fluctuation correction portion which corrects the image data corrected by the shading correction portion using a fluctuation correction condition corresponding to the pixel position in the main scanning direction of the image data; and
a fluctuation correction condition calculating portion which obtains image data output by the reading portion reading the reference member and corrected by the shading correction portion, corresponding to a predetermined pixel position in the main scanning direction and pixel positions peripheral to the predetermined pixel position in the main scanning direction, and calculates the fluctuation correction condition corresponding to the predetermined pixel position based on a fluctuation value obtained from image data, of the obtained image data, other than a first number of image data having lower brightness and a second number of image data having higher brightness and a reference value corresponding to the predetermined pixel position, wherein the second number is less than the first number.

2. A document reading apparatus according to claim 1, wherein the fluctuation correction condition calculating portion calculates the fluctuation correction condition for each of a plurality of predetermined pixel positions, and
the fluctuation correction portion calculates fluctuation correction conditions corresponding to pixel positions in the main scanning direction of image data to be corrected, based on the fluctuation correction condition calculated by the fluctuation correction condition calculating portion.

3. A document reading apparatus according to claim 1, wherein the fluctuation correction condition calculating portion obtains the reference value based on image data output by the reading portion reading the reference member before reading a plurality of documents and corrected by the shading correction portion, and obtains the fluctuation value from image data output by the reading portion reading the reference member between a document and a document when the reading portion reads the plurality of documents continuously and corrected by the shading correction portion.

4. A document reading apparatus according to claim 1, further comprising a shading correction condition calculating portion which calculates the shading correction condition based on image data output by the reading portion reading a shading correction reference member different from the reference member before reading the document, wherein the fluctuation correction condition calculating portion obtains the reference value based on image data output by the reading portion reading the reference member after reading the shading correction reference member and corrected by the shading correction portion, and obtains the fluctuation value from image data output by the reading portion reading the reference member between a document and a document when the reading portion reads the plurality of documents continuously and corrected by the shading correction portion.

5. A document reading apparatus according to claim 1, further comprising a storage portion which stores the shading correction condition which is calculated in advance and the reference value which is calculated in advance.

6. An image processing method for a document reading apparatus, wherein the document reading apparatus includes:
a conveyance portion which conveys a document;
an illuminator which illuminates the document that is being conveyed by the conveyance portion;
a reading portion which reads, at a read position, the document that is being conveyed by the conveyance portion; and
a reference member arranged opposite to the read position, wherein the image processing method comprises:
a shading correction step of performing a shading correction on image data output from the reading portion using a shading correction condition corresponding to a pixel position in a main scanning direction of the image data;
a fluctuation correction step of correcting the image data corrected by the shading correction step using a fluctuation correction condition corresponding to the pixel position in the main scanning direction of the image data; and
a fluctuation correction condition calculating step of obtaining image data output by the reading portion reading the reference member and corrected by the shading correction step, corresponding to a predetermined pixel position in the main scanning direction and pixel positions peripheral to the predetermined pixel position in the main scanning direction, and calculating the fluctuation correction condition corresponding to the predetermined pixel position based on a fluctuation value obtained from image data, of the obtained image data, other than a first number of image data having lower brightness and a second number of image data having higher brightness and a reference value corresponding to the predetermined pixel position, wherein the second number is less than the first number.

* * * * *